Feb. 28, 1950　　　M. K. KUTHER　　　2,498,993
FISH CLEANING APPARATUS

Filed April 2, 1949　　　2 Sheets-Sheet 1

INVENTOR,
Max K. Kuther
BY
J. E. Trabucco
ATTORNEY.

Feb. 28, 1950 M. K. KUTHER 2,498,993
FISH CLEANING APPARATUS
Filed April 2, 1949 2 Sheets-Sheet 2

INVENTOR.
Max K. Kuther
BY
J. E. Pralrucco
ATTORNEY.

Patented Feb. 28, 1950

2,498,993

UNITED STATES PATENT OFFICE 2,498,993

FISH CLEANING APPARATUS

Max K. Kuther, Monterey, Calif.

Application April 2, 1949, Serial No. 85,205

2 Claims. (Cl. 17—3)

This invention relates to improved fish cleaning apparatus.

The present invention provides novel fish cleaning apparatus embodying synchronized mechanism by means of which a number of fish having their heads and tails removed are successively conveyed into operative relation with a suction device which withdraws the entrails therefrom. The suction device embodies a rotatable valve member arranged in synchronized relation with a reciprocating piston which is adapted to provide suction within the valve member at timely intervals for the withdrawal of the entrails from each fish as it operatively engages with and becomes positioned opposite an opening in said valve member.

The primary object of my invention is to provide improved fish cleaning apparatus of the kind characterized embodying a novel combination which is economical in operation, simple in construction and efficient in the manner it operates.

Figure 1:
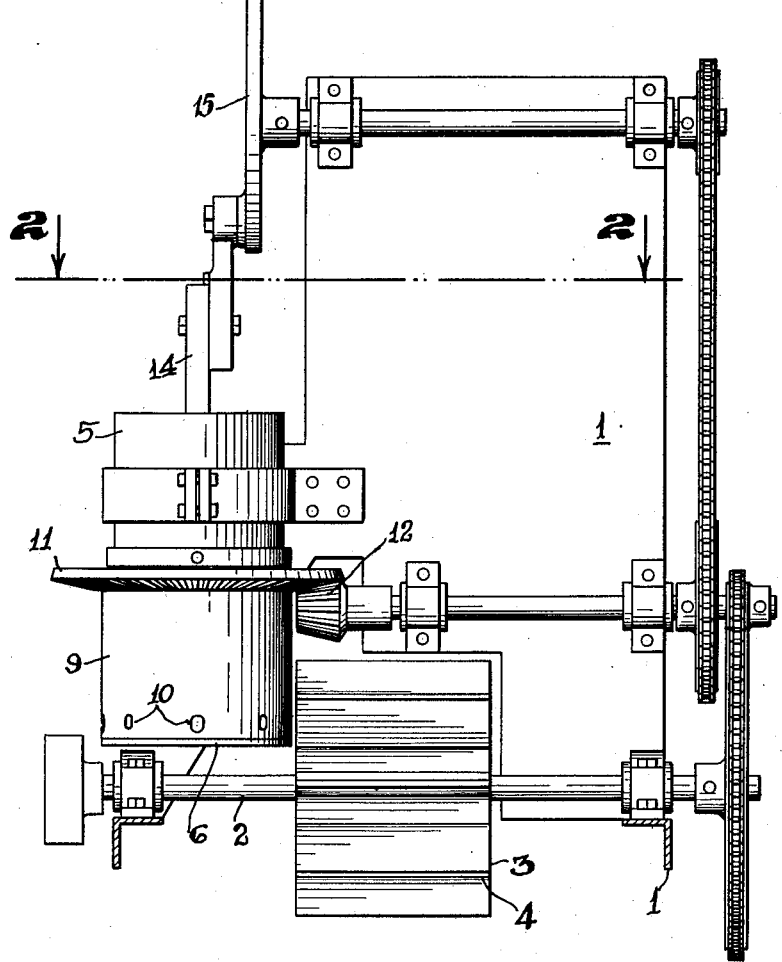
Fig. 1 is an end view of the apparatus embodying my invention.
Figure 2:
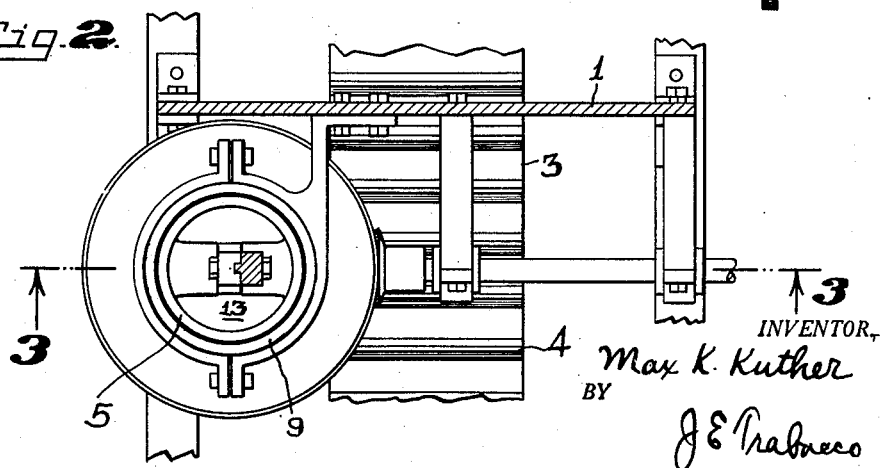
Fig. 2 is a sectional view taken on the line 2—2 of Fig. 1.
Figure 3:
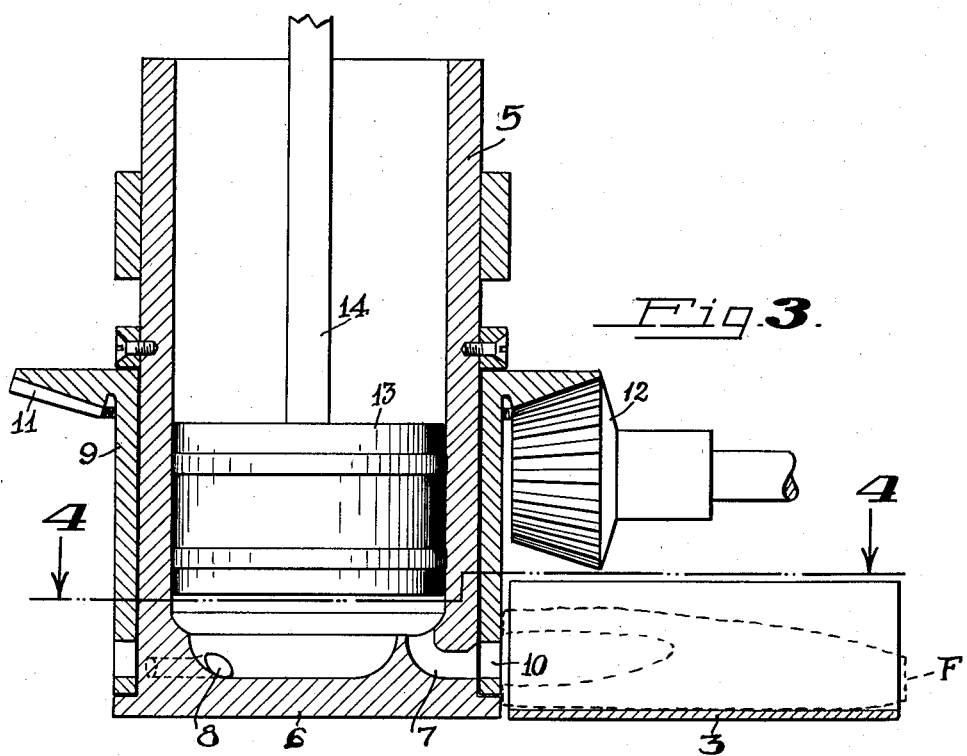
Fig. 3 is an enlarged sectional view taken on line 3—3 of Fig. 2.
Figure 4:
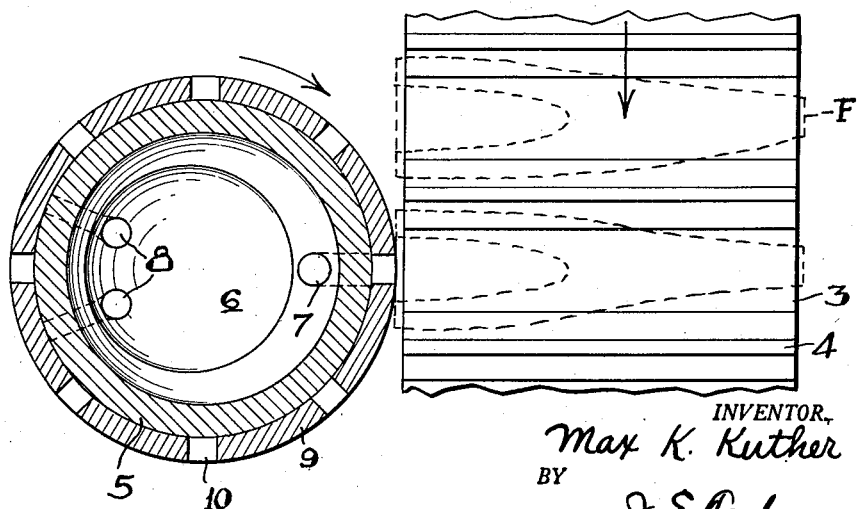
Fig. 4 is a sectional view taken on the line 4—4 of Fig. 3.

Referring to the drawings the numeral 1 designates a suitable supporting structure having a drive shaft 2 journaled thereon, the said drive shaft being connected by a pulley and belt or other means to a source of power. Operatively arranged for synchronized movement with the shaft 2 is an endless fish conveyor 3 having a plurality of uniformly spaced transverse cleats 4 which form pockets for holding fish. Although not forming a part of the present invention suitable knives are preferably arranged laterally at opposite sides of the conveyor for the purpose of cutting the heads and tails from the fish as they are conveyed toward the entrail extracting means.

Mounted on the supporting structure 1 is a substantially vertical cylinder 5 which has an open upper end and a bottom 6. The bottom 6 of the cylinder 5 has an inlet channel 7 leading from the peripheral edge of the said bottom to the interior of the cylinder. There are also provided in the bottom one or more outlet channels 8 which extend from the interior of the cylinder to points on the periphery of the said bottom. The outlet channels 8 are positioned in suitably spaced relation to the inlet channel 7, and the combined carrying capacity of the said outlet channels are substantially greater than that of the inlet channel.

Rotatably mounted on the cylinder 5 is a circular sleeve-like valve member 9 having a plurality of uniformly spaced openings 10 which are arranged to register with the inlet channel 7 and the outlet channels 8. It will be noted that the inlet channel 7 and the outlet channels 8 are so arranged with respect to each other that when the inlet channel is in registry with an opening 10 of the valve member the outlet channels will be closed by the valve member, and vice versa.

Secured to the valve member 9 is a circular bevel gear 11 which meshes with a bevel gear 12. The bevel gear 12 is suitably connected by mechanical means to the shaft 2, thereby effecting the synchronized rotation of the valve member 9 with the shaft 2.

Mounted for reciprocating movement in the cylinder 5 is a closely fitting piston 13 which is connected by a connecting rod 14 to a crank 15. The crank is operatively connected by suitable mechanical means to the shaft 2. It is therefore to be noted that the fish conveyor 3, the valve member 9 and the piston 13 are synchronized so that a fish F is positioned in alignment with an opening 10 of the valve member when the said opening is in registry with the inlet channel 7, and when the piston is moving upwardly on its suction stroke. It will also be noted that the valve member 9 is in a position with the inlet channel 7 closed and the outlet channels 8 open when the piston is moving downwardly on its discharge stroke. The piston 13 has commenced its upward movement at a time when an opening 10 of the valve member 9 is coming into registry with the inlet channel 7. At this same time the larger or head end of a fish F begins to contact the curved outer surface of the valve member 9 and as the conveyor 3 continues to convey the fish forwardly and the valve member continues its rotation, the opening 10 gradually comes into complete registry with the inlet channel. At this latter point in the cycle the piston is just completing is upward suction stroke and the longitudinal opening in the fish is in full registry with the valve opening 10 which is then in full registry with the inlet channel 7. The suction created in the cylinder 5 by the upward movement of the piston 13 and applied through the registering valve opening 10 and the inlet channel 7 to the fish then engaging with the valve member, causes the said fish to firmly adhere to the said valve member. Since the entrails of the fish are exposed at its larger end after its head is severed, the suction applied to the said large end of the fish causes its entrails to be drawn into the cylinder 5. By the time the entrails have been drawn into the cylinder the piston has terminated its upper stroke and is about to start its down stroke. By the time the piston is starting its downward stroke the valve member 9 has been rotated sufficiently to nearly close the channel 7. As the piston is moving downwardly the valve member 9 opens the outlet channels 8 and thereby allows the fish entrails to be discharged by the pressure in the cylinder 5 through the said outlet channels.

What I claim is:

1. In fish cleaning apparatus, a stationary cylinder having its bottom end closed and its upper end open, the said cylinder having spaced inlet and outlet channels in its side walls communicating with its interior, a rotatable sleeve-like valve mounted on the cylinder and having a plurality of circularly arranged spaced openings arranged for alternate registration with the inlet and outlet channels of the cylinder, a reciprocating piston fitting in the cylinder and arranged for movement in one direction on a suction stroke and in the opposite direction on a discharge stroke, a conveyor for successively bringing fish having their heads severed into engagement with valve, the conveyor, the valve and the piston being synchronized so that fish are successively conveyed into a position with their cut ends positioned opposite an opening in the valve when the piston is making its suction stroke and at a time when the said opening in the valve is registering with the inlet channel and the outlet channel is closed.

2. In fish cleaning apparatus a stationary cylinder having its bottom end closed and its upper end open, the said cylinder having spaced inlet and outlet channels in its side walls communicating with its interior, a rotatable sleeve-like valve mounted on the cylinder and having a plurality of circularly arranged spaced openings arranged for alternate registration with the inlet and outlet channels of the cylinder, a reciprocating piston fitting in the cylinder and arranged for movement in one direction on a suction stroke and in the opposite direction on a discharge stroke, a conveyor for successively bringing fish with their heads severed into engagement with the valve, and operating means synchronizing the valve, the conveyor and the piston so that fish are successively conveyed into positions in which their cut ends are opposite an opening in the valve when the piston is making its suction stroke and at a time when the said opening in the valve is registering with the inlet channel, the said piston and the valve being synchronized so an opening of the valve is in registry with the outlet channel when the piston is making its discharge stroke and the inlet channel is closed.

MAX K. KUTHER.

No references cited.